（12） United States Patent
Hallock

(10) Patent No.: US 10,219,154 B1
(45) Date of Patent: Feb. 26, 2019

(54) FRICTIONLESS OR NEAR-FRICTIONLESS 3 FACTOR USER AUTHENTICATION METHOD AND SYSTEM BY USE OF TRIAD NETWORK

(71) Applicant: Richard J. Hallock, Naples, FL (US)

(72) Inventor: Richard J. Hallock, Naples, FL (US)

( * ) Notice: Subject to any disclaimer, the term of this patent is extended or adjusted under 35 U.S.C. 154(b) by 260 days.

(21) Appl. No.: 15/234,652

(22) Filed: Aug. 11, 2016

Related U.S. Application Data

(60) Provisional application No. 62/206,333, filed on Aug. 18, 2015.

(51) Int. Cl.
*H04L 29/06* (2006.01)
*H04W 12/06* (2009.01)
*H04W 12/08* (2009.01)

(52) U.S. Cl.
CPC ......... *H04W 12/06* (2013.01); *H04L 63/0807* (2013.01); *H04L 63/0853* (2013.01); *H04L 63/0876* (2013.01); *H04L 63/102* (2013.01); *H04W 12/08* (2013.01)

(58) Field of Classification Search
CPC ..... H04L 63/00; H04L 63/08; H04L 63/0807; H04L 63/0853; H04L 63/0861; H04L 63/0876; H04L 63/0892; H04L 63/10; H04L 63/102; H04L 63/12; H04W 12/06; H04W 12/08
See application file for complete search history.

(56) References Cited

U.S. PATENT DOCUMENTS

| | | | |
|---|---|---|---|
| 6,430,407 B1 | 8/2002 | Turtiainen | |
| 6,853,977 B1 | 2/2005 | Niwa | |
| 7,043,230 B1 | 5/2006 | Geddes et al. | |
| 7,287,270 B2 | 10/2007 | Kai | |
| 7,870,599 B2 | 1/2011 | Pemmaraju | |
| 7,979,054 B2 | 7/2011 | Baysinger | |
| 8,249,649 B2 * | 8/2012 | Tseng | H04W 48/18 370/331 |
| 8,365,258 B2 | 1/2013 | Dispensa | |
| 8,369,833 B2 | 2/2013 | McClain | |
| 8,434,133 B2 | 4/2013 | Kulkarni et al. | |
| 8,443,425 B1 | 5/2013 | Evanes et al. | |
| 8,493,971 B2 | 7/2013 | Matsumoto | |

(Continued)

*Primary Examiner* — Eric W Shepperd
(74) *Attorney, Agent, or Firm* — Larson & Larson, P.A.; Frank Liebenow; Justin P. Miller

(57) ABSTRACT

A system and method for the secure frictionless or near-frictionless authentication of a user's identity resulting in a determination signal that the user is who they claim to be, access granted, or is not who they claim to be, access denied. In one embodiment, a user accesses the login page of a website and, after a short pause, is granted access to a restricted website resource, for example their bank account. During the short pause signals are exchanged over a triad of telecommunication networks, from the webserver to an App on the user's cellphone where credentials and probability of possession are collected, encrypted and sent over near proximity network to the device being used to make the original login request that in turn forwards the accumulated authentication tokens to the webserver for verification. Upon success of the verification the user is granted access to the restricted resource, in this example, their bank accounts.

21 Claims, 13 Drawing Sheets

(56) References Cited

U.S. PATENT DOCUMENTS

| | | | |
|---|---|---|---|
| 8,625,796 B1* | 1/2014 | Ben Ayed | H04L 63/0853 380/258 |
| 8,973,109 B2 | 3/2015 | Jillings | |
| 8,990,909 B2 | 3/2015 | Kelley | |
| 2005/0010756 A1* | 1/2005 | Clerc | G06F 21/33 713/155 |
| 2006/0153346 A1 | 7/2006 | Gonen et al. | |
| 2008/0022375 A1 | 1/2008 | Stanley | |
| 2008/0098225 A1 | 4/2008 | Baysinger | |
| 2010/0022239 A1* | 1/2010 | Anzai | B60R 25/24 455/434 |
| 2011/0110364 A1* | 5/2011 | Fried | G06Q 30/02 370/352 |
| 2011/0212707 A1* | 9/2011 | Mahalal | G06Q 20/32 455/411 |
| 2011/0285504 A1* | 11/2011 | Puerto | G06K 9/00973 340/5.84 |
| 2012/0240204 A1* | 9/2012 | Bhatnagar | G06F 21/35 726/5 |
| 2014/0136419 A1* | 5/2014 | Kiyohara | G06Q 20/3221 705/67 |
| 2014/0179276 A1* | 6/2014 | Kang | H04W 4/008 455/411 |
| 2014/0181955 A1* | 6/2014 | Rosati | G06F 21/44 726/18 |
| 2014/0341440 A1* | 11/2014 | Walch | G06F 21/40 382/116 |
| 2014/0365781 A1* | 12/2014 | Dmitrienko | G06F 21/34 713/185 |
| 2015/0121501 A1 | 4/2015 | Khalid et al. | |
| 2015/0154436 A1* | 6/2015 | Shi | H04L 63/0861 382/124 |
| 2015/0206139 A1* | 7/2015 | Lea | G06Q 20/02 705/44 |
| 2016/0234023 A1* | 8/2016 | Mozer | H04L 9/3231 |

* cited by examiner

FRICTIONLESS OR NEAR-FRICTIONLESS 3 FACTOR USER AUTHENTICATION METHOD AND SYSTEM BY USE OF TRIAD NETWORK

CROSS-REFERENCE TO RELATED APPLICATION

This application claims priority to provisional patent application No. 62/206,333 filed on Aug. 18, 2015. The provisional patent application identified is incorporated herein by reference in its entirety to provide continuity of disclosure.

FIELD OF THE INVENTION

The present invention relates generally to the use of telecommunications networking and computational machines in the process of validating that an individual is who they claim to be for the purpose of accessing limited access resources.

BACKGROUND OF THE INVENTION

Perhaps the best known application of user authentication and access control is that of the Internet wherein in order to gain access to an Internet resource the user seeking the access must provide proof of their identity sufficiently enough to satisfy the requirements of a user authentication authority. However, there are many other network access control applications that are not within the domain of the "Internet" but which share much in common with the need to establish and validate the identity of a user requesting access to a thing, device, facility, service or resource. All of these seemingly different and unrelated access control applications have in common the need to ascertain and validate the identity of the user requesting access to that which is being protected. The very fact of there being an access control system validates the substantial possibility there are those, who would not be granted access otherwise, wishing nonetheless to obtain it, in some cases by any means necessary including the impersonation of one who has authorized access.

Of course anything worth protecting by use of an access control system probably has several layers of protection to keep the unwanted out, to know when the unwanted has managed to gain access and to prevent the unwanted from causing damage once they have breached the other layers and gained access. Such an onionskin security model is not unusual and relies primarily on a first line of defense of keeping the unwanted out in the first place, the very purpose and intent of the present invention.

As the first line of defense it is necessary that the access control system used be appropriate for the application it is being used for by providing the level of security appropriate for the application.

In networking applications such as those using Local Area Networks (LAN), Wide Area Networks (WAN) or the Internet, at present the most well known user authentication system is perhaps the "user name and password" method employed for use in Internet applications in which, in order to access a network resource, it is necessary to provide both a user name and a password that is known to the resource or its representative. In banking a very well known authentication system is associated with the Automatic Teller Machine (ATM) card wherein an ATM can be accessed by the combined use of an ATM bank card and a Personal Identification Number (PIN). The user name and password model has fallen on disfavor in many instances because of the ease with which this authentication method can be compromised and exploited by unauthorized users. The ATM card and PIN approach has fared much better but is still far from secure as has been demonstrated multiple times by recent corporate and government break-ins in the 2014-2015 time frame where the perpetrator(s) managed to obtain both the ATM numbers and associated PINs belonging to millions of unsuspecting individuals worldwide.

In the field of networking such as LAN, WAN and Internet, advances in user authentication have improved the situation and diminished the frequency of fraud and break-ins by use of impersonation. One approach employs use of "one time passwords" where a password is assigned at the time a user attempts access to a network resource and then is never used thereafter. Typically, these solutions are implemented using some type of device the user must have in their possession at the time network access is being attempted; devices such as a cellphone or a specialized key token like the SecureID. A more interesting twist to user authentication is the use of biometrics such as retina scans, finger/palm prints, facial recognition and voice. Similar to the one-time-use password method, the biometric method requires the user requesting access have a device the authenticating system can communicate with that is capable of capturing the biometric token and forwarding same over the networks to the authenticating system for verification. Though certainly more secure than other authentication methods mentioned above, the biometric approach suffers from being time consuming resulting in rather large tokens that need to be transported to the authenticating system and which themselves can be impersonated.

Returning to the Banking and Credit Card application of user authentication, the most recent advancements have moved away from the card and PIN approach, which can be easily compromised, to a solution based on the "chip-and-PIN" methodology. In this approach the common credit/debit card is replaced by a card of the same size and heft but one which includes a baked on computer circuit. This chip circuit contains all of the user information that was historically stored on the magnetic strip of the card, plus a certificate and a radio frequency transmitter. In application, the user seeking access to a resource (ATM machine or credit card terminal) for the purpose of financial transaction inserts the card into the updated reader device and then provides a PIN associated with the account. The chip device communicates with the terminal via radio frequency network and provides user identification, and one-time password like identification number as encrypted data. While this chip-and-PIN solution is much more secure than prior technologies used in these applications, it is still not a total solution. Research points to, for example, weaknesses in the radio frequency protocols that may open avenues of access to man-in-the-middle attacks. Additionally, it has been demonstrated by research that the radio frequency transmissions can be captured in a second or less using a device, such as a cell phone augmented by readily available electronic devices, thus potentially enabling a perpetrator to steal and compromise a user's identity without ever having access to the card itself and just by being in the near vicinity to the card. Finally, there is good old fashion theft of the card and PIN thereby allowing the impersonation of the user's identity.

Of course, there are many other applications that rely on user authentication although some may not be as obvious as above. One such less-than-obvious user authentication application is the "electronic keyless fob" used in many applications to gain access to a resource. A user needing access to a resource such as, for example an automobile, clicks a button on a keyless fob when approaching the auto in order to unlock the doors to allow access. In this application the computer within the auto senses the radio frequency signal of the keyless fob, assumes the person operating the device is the authorized user and then does as requested by unlocking the doors. Another similar example is when the homeowner approaches the home and presses the button on a keyless fob to disable the security system and unlock the front door. In this case, the hub computer of the security and automation system senses the radio frequency signal from the keyless fob device, assumes the person pressing the device button is authorized and in response does as commanded by disabling the security system and unlocking the front door. Of course there are the access control systems at institutions, government buildings, businesses and others wherein authorized users are granted access upon presentation of some form of identification such as a radio frequency identification card, most of which are easily defeated by nothing more complex than theft and when the device of choice is presented the access control system assumes the person is who the access device claims they are. In all these examples, and many, many more, the operative word is "assumes." The "user authentication" experience is very limited in scope to simply "assuming" the person operating the keyless fob device or presenting the stolen credentials is the person they claim to be.

There are more sophisticated keyless fob implementations that adopt use of the "Personal Identifier Number" similar to that used in networking application by requiring the user to enter a PIN number on a keypad device at the door or entryway in addition to pressing a button on a keyless fob or presenting a chip'ed identification card. This methodology is somewhat similar to multifactor user authentication employed in networking applications and easily defeated by nothing more complex than theft.

Several examples of user authentication are provided and most share a common aspect that is becoming more and more negative from the user's perspective. In the industry this is referred to as "friction," a word used to identify the amount of involvement on the user's part that is required to gain access to a protected resource. This friction leads to push back and the upshot of that is a general weakening of the authentication processes. Some examples include; users adopting use of very short and easy to remember user names and passwords, or adopting use of the same user name and password for most of their authenticated accounts, or using PIN's derived from the last four of their social security number or telephone number or license plate number and finally, users being reluctant to ever change a user name or password or PIN assignment because of the memorization issues involved.

More sophisticated user authentication implementations attempt to improve upon security by adopting use of biometrics that subject the user to substantial friction, much more than that associated with password like systems. Each time the user requires access it is necessary to scan the eye, or fingerprint, or palm print, or face, or to speak a prearranged stanza into a microphone as an audio phonic PIN. While in some regard these methods improve overall security, they do so at the expense of forcing users to lengthy and sometime inconvenient bio-capture sequences and all suffer from the risk of "man in the middle" attacks wherein the bio image is stolen and reused to impersonate the actual owner.

In summary, current prior art user authentication methodologies fall into a small number of well defined categories including: (1) implied authentication as a result of possession, (2) self authentication by use of user name and password with optional PIN or device generated token or captured biometric, (3) authentication by use of out-of-band feedback loop with transcribed token, (4) centralized out-of-band by use of self provided biometrics and/or tokens/passwords and (5) multi-factor by use of identification device/card and PIN/Password.

Of course, the entire reasoning for user authentication systems is to ensure that only authorized persons gain access to secured resources. As is well known by many real life examples, these various user authentication systems are tested regularly by cyber attackers and on a regular basis the hackers can break the user authentication systems and gain access to secured resources they are otherwise not allowed access to.

SUMMARY OF THE INVENTION

Briefly put, user authentication is the process of verifying an individual is who they claim to be, normally performed in advance of allowing the individual access to some type of restricted resource or service. To that end, the apparatus and method of the invention provides for frictionless or near-frictionless secure authentication of individuals attempting to gain access to, for example, a secured resource, service or physical property, by use of a novel triad network methodology. In one embodiment, there is provided a frictionless apparatus and method for securing network resources made available on the Internet. The method includes (1) transmission over a network connection of a users request to access a secure network resource using a personal computer like device (2) receipt of which causes an authentication authority server on the network to retrieve the users profile, transmit a security token back to the requesting device and to create and send an encrypted "Session Identifier" token (eSID) combined with encrypted "Personal Identifier Requirement" (ePIR) by use of a second cellular network to a uniquely addressable cellphone located on or near the person making the request and (3) upon receipt of the security token the original requesting device will establish a pairing with the cellphone device identified by the security token and (4) upon receipt of the ePIR and eSID by the cellphone, and after confirming the cellphone is in the possession of its authorized owner by consulting an "Owner Possession Probability Factor" (OPPF), cellphone device identification information are collected and "Personal Identifiers" (PI) as specified in the ePIR and as possibly determined by the value of OPPF are collected and, including the OPPF, combined with the eSID and encrypted using a provisioned encryption key resulting in an encrypted "User Identification" token (eUID) that uniquely identifies the cellphone in use by the user and its associated cell network and confirms the cellphone is in the possession its of authorized owner, and then (5) sending the eUID over a third secure wireless network from the cellphone to the user access device, a PC in this explanation, used to make the original request after which the (6) eUID is then transmitted over the original network to the authentication authority server where the encrypted data are decrypted and (7) the decrypted eSID is verified to be the SID that was created and sent by the authentication authority server and (8) that the cellphone identification of the eUID is the same cellphone device identification information as originally captured and now on file with the authenticating server and that the personal identifier(s) from the eUID match those on file with the authentication server. In this way the user access to the network resource is confirmed or denied and if affirmed, is done so in a secure frictionless or near-frictionless way, depending on the Personal Identifier Request employed by the implementation and the value of Owner Possession Probability Factor at the time of authentication, that cannot be impersonated by a bad actor.

In yet another embodiment of the invention there is provided a frictionless apparatus and method for securing a physical property such as, for example, an automobile. The method includes (1) transmission over a secure wireless network of an informational signal initiated by a user clicking a button on a remote key FOB associated with the secured property with (2) said transmission being received by an authentication device within the secured property. In this example case, the onboard computer of the automobile, causing the authentication device to retrieve the user profile of the access device in use, the FOB, and to transmit back to the access device, FOB, a security token which (3) upon receipt causes the access device to establish a paired near proximity network connection with the users cellphone while (4) the authentication device creates an encrypted "Session Identifier" (eSID) and an encrypted Personal Identification Requirement (ePIR) transmitting both by use of cellular network to a cellphone on or in the proximity of the person signaling the FOB request and (5) upon receipt of the eSID and ePIR by the cellphone, and after confirming the cellphone is in the possession of its authorized owner by consulting the "Owner Possession Probability Factor" (OPPF), cellphone device identification information are collected and "Personal Identifiers" (PI) as specified in the ePIR and as possibly determined by the value of OPPF are collected, including OPPF, and combined with the eSID and encrypted using a provisioned encryption key resulting in the encrypted "User Identification" token (eUID) that uniquely identifies the cellphone in use by the user and its associated cell network and affirms the cellphone is in the possession of its authorized owner, and then (6) sending the eUID over a third secure wireless network from the cellphone to the user access device, FOB in this case, used to make the original request after which the (7) eUID is then transmitted over the original network to the authentication device where the encrypted data are decrypted and (8) the decrypted SID is verified to be the SID that was created and sent by the authentication device and (9) that the cellphone identification in the UID is the same cellphone device identification information as originally captured and now on file with the authenticating device and that the personal identifier(s) from the UID match those on file with the authentication device. In this way the user access to the physical property, in this example an automobile is affirmed or denied and if affirmed, is done so in a secure frictionless way that cannot be impersonated by a bad actor.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
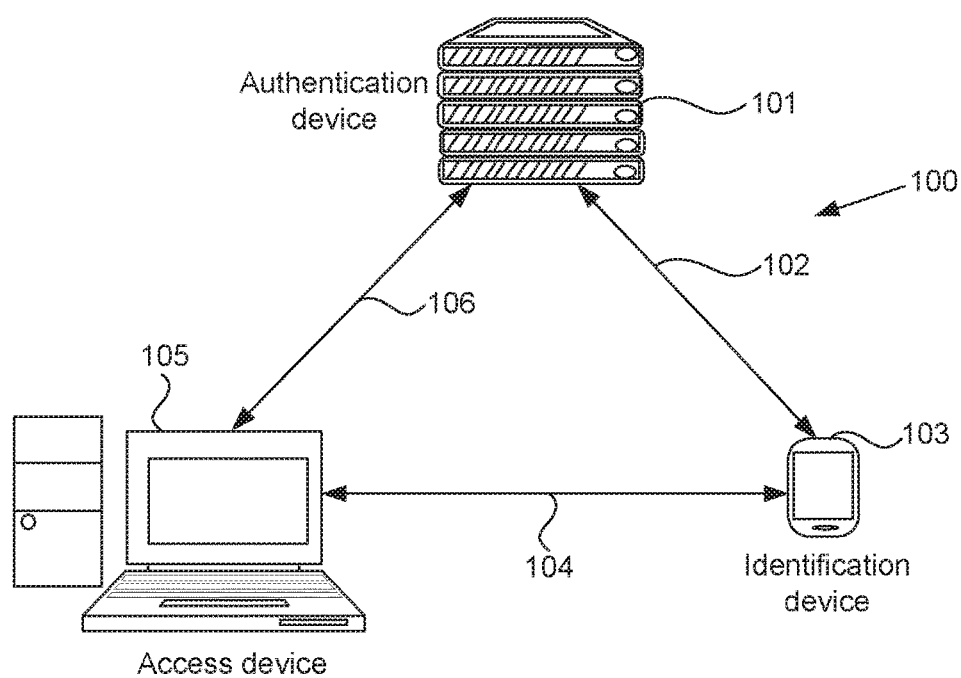
FIG. 1 illustrates an exemplary architecture of a triad network providing both secure frictionless and secure near-frictionless user access authentication.

In overview, the system and method of this invention provide for user authentication in a secure frictionless or near-frictionless way by use of an authentication network triad having three sides, side a, side b and side c, and three vertices, vertex A, vertex B and vertex C. At vertex A there is an Access Device having connection to one network, side a, and the ability to create an instance of a second near proximity wireless network, side c. At vertex B is the Authentication Device with a network connection to side a of the triad and the ability to create an instance of wireless network side b of the triad. At vertex C is the wireless Personal Identity Device, cellphone, with wireless cellular network connection providing for an instance of network side b and a second Bluetooth wireless near proximity network connection via which an instance of network side c may be created. Each of the vertex devices are pre-provisioned with the necessary computer program software and data necessary to enable them to perform their respective rolls in the user authentication process in such a way as to make it extremely difficult to impersonate the identity of the rightful owner of the Personal Identity Device.

A brief description of the process of this invention begins with an individual who, having been registered as an authorized user with access rights to a given secure resource and in possession of their cellphone Personal Identity Device, signals their intent to access the secured resource. This signal results in the Access Device providing the individual's identification token assigned to the individual at the time their account was established. For example, a user name provided to a login webpage. As will be seen, this identity token need not be a closely held secret but should not be unnecessarily advertised either. The user's identity token is transmitted by the Access Device, perhaps a PC, at vertex A to the Authentication Device, perhaps a web server, at vertex B over side a of authentication network triad using secure protocols. The Authentication Device at vertex B uses the identity token to locate and activate the users profile record stored, for example, in a user database of vertex B. The Authentication Device retrieves a Security Token, transmitting it securely over triad network side a back to the Authentication Device at vertex A. Upon receipt of the Security Token the Access Device will attempt to establish an instance of a secure near proximity network connection over side c of the triad with the Personal Identity Device at vertex C, validating the connection pairing by use of the Security Token. In parallel with this activity, the Authentication Device is preparing a packet containing an encrypted Session Identifier that uniquely identifies this authentication session, and an encrypted Personal Identifier Requirements token that identifies what, if any, proofs of identity will be required to satisfy this authentication session. The user may be asked to produce any of several different forms of identity or to produce none at all. A communications method and protocol are selected from a list of choices and utilized to establish an instance of a wireless network connection over the cellular network, side b of the triad, to the Personal Identity Device at vertex C. The encrypted Session Identifier and encrypted Personal Identifier Request are then transmitted to the Personal Identity Device. Upon receipt of the encrypted Personal Identifier Request the Personal Identity Device inspects the Owner Possession Probability Factor, a value that is updated on a real time basis, to determine if an additional proof of identity is necessary and if so it is added to the required list. Based on the list of proofs requirement, each proof is captured from the user and then assembled into a User Identifier token along with the encrypted Session Identifier, the unique identifier of the Personal Identity Device and the controller address of the near proximity network controller. The User Identifier is then encrypted and transmitted over the near proximity wireless network, side c of the triad, to the Access Device at vertex A. The Access Devices at vertex A retrieves the encrypted User Identifier and transmits it over network side a to the Authentication Device at vertex B. Receiving the encrypted User Identifier, the Authentication Device decrypts the token and performs verification of all values included therein and makes a determination to either grant or deny the authentication request based on the results of the verification, taking whatever additional actions as may be required by the secure resource for which access is being granted.

With reference to FIG. 1, an exemplary architecture of a triad network 100 supporting the present invention is illustrated. The triad network comprises three legs (102, 104 and 106) representing an unbroken network connection between three devices, a user Access Device (UAD) 105, an Authentication Device (AD) 101 and a user Personal Identity Device (ID) 103. A first network triad leg 106 between UAD 105 and AD 101 provides for digital data transfer over what may be an unsecure network such as, for example, Internet or over a secure network such as, for example, a corporate LAN behind firewalls. A second network triad leg 102 between AD 101 and ID 103 is a secure and uniquely addressable network similar to, but not necessarily the same as, the cellular network; a network in which on a worldwide basis there can be only one singular ID 103 with a given specific address. The final third triad network leg 104, between ID 103 and UAD 105, provides a secure and uniquely identifiable network normally of the wireless type such as that that can be accomplished using Bluetooth; a wireless network in which the address of the ID's 103 network controller is guaranteed to be unique. While various network examples are provided in this explanation, they are done so for explanatory purpose only and do not infer a limitation as to the type or nature of the networking technology employed so long as security and unique identity are provided for on the 102 and 104 and 106 legs of the triad. The network 100 as shown in this embodiment represents a system by which user access to restricted resources is provided for by employing a frictionless (minimal or no user involvement other than making an access request) or near-frictionless (minimal user involvement in addition to making an access request) methodology while at the same time doing so in a way that reduces or eliminates entirely the possibility of impersonation attacks. When a user seeks to access a restricted resource they do so by indicating their desire using UAD 105, user access device 105 to transmit a request to the AD 101, authentication device 101, over network 106. The access request is a digital signal or data packet that identifies the user either implicitly or explicitly to the AD 101 such that the AD 101 can, upon consulting internally stored data captured during provisioning, identify the user as a potential valid candidate to make the request. Following determination that the user is a potential candidate for access to the secured resource, the AD 101 then initiates the authentication process to confirm the user is who they claim to be. The AD 101 activates the user's profile record from local storage and from it obtains the assigned Security token that is then sent by AD 101 to the UAD 105 over network 106. Upon receipt of the Security token the UAD 105 initiates an instance of near proximity wireless network 106 to ID 103 using the Security token provided to validate the network connection is to the specific device intended. The AD 101 generates a Session Identifier, SID, which is a unique identifier value known only to the AD 101. The SID is encrypted to create the eSID. The AD 101 also generates and encrypts a personal identifier requirement, ePIR, based on settings provisioned in the user profile. The ePIR can specify either no requirement for proof of identity, requirement for a specific form of proof of identity (such as entry of a personal identification number or provision of a biometric) or a randomized selection of type of proof of identity from a list of candidates. AD 101 then creates an instance of wireless network 102 over the cellular networks and transmits the eSID and ePIR over wireless network 102 to the ID 103. The communications method employed for this transmission is selected from a list of choices in the profile that may include SOFTPHONE, SMS text message, EMAIL, or indirect via a network server proxy. The address of the ID 103 is unique on the 102 network on a worldwide basis.

Upon receipt, the ID 103 decrypts the ePIR and interrogates the Owner Possession Probability Factor (OPPF) and if finding a setting value to be within a range as provisioned will add a proof of identity to the PIR and will then process the PIR request by inputting from the user their proof of identity which may be any combination of Personal Identity Number, Password or any of a number of different Biometrics. Optionally the AD 101 may have requested a Not Required PIR and OPPF may have been above the provisioned range requiring proof of possession in which case ID 103 would simply ignore the PIR requirement. The ID 103, having established an instance of wireless near proximity network 104 with UAD 105 will collect the wireless network address being used as well as 103 ID device identifier (ICCID or IMSI or MEI) and then generate from the data collected an encrypted user identifier eUID that it then transmits to the LAD 105. Upon receipt of the eUID the UAD 105 will transmit the eUID over network 106 to AD 101 where user credentials are validated. AD 101 will decrypt and validate the contents of the eUID, in some cases by use of provisioned data after which the user is either granted or denied access based on the outcome of the verification process.

Figure 1A:
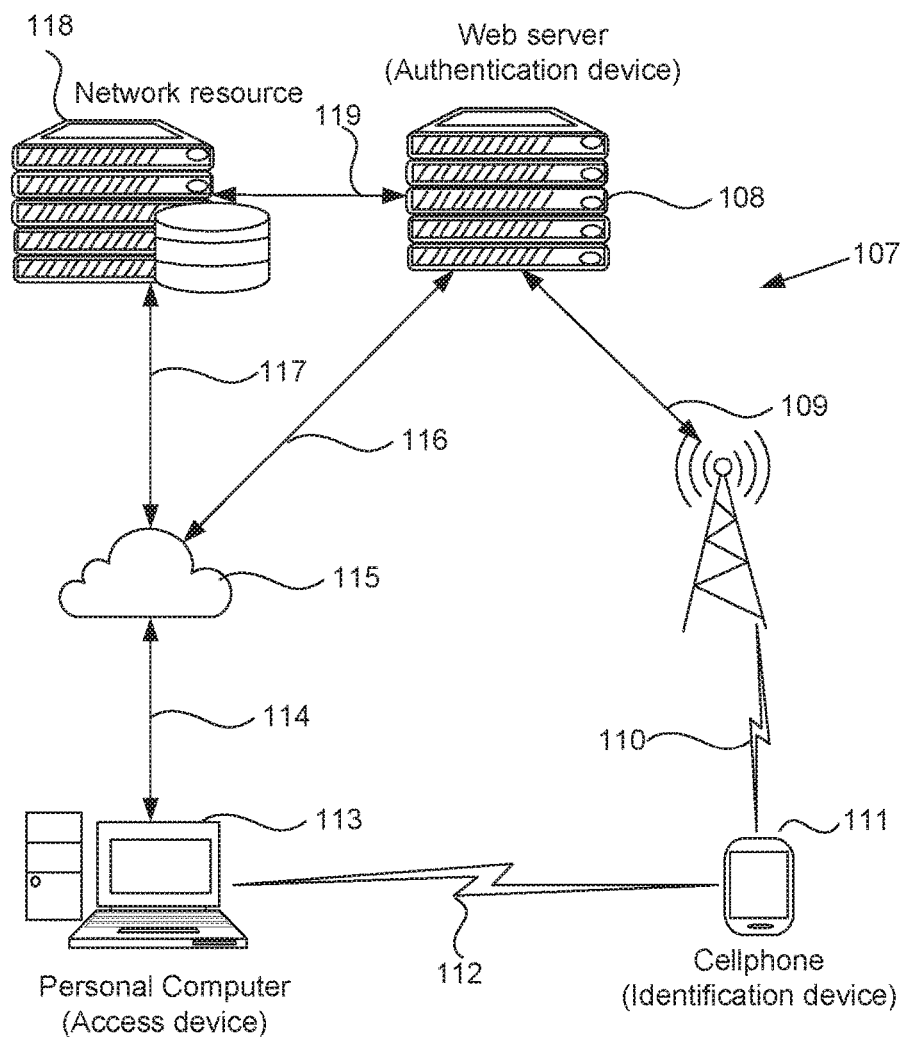
FIG. 1a illustrates an exemplary architecture of one embodiment of the triad network authentication to facilitate user authentication process and access to network resources.

With reference to FIG. 1a, an exemplary architecture 107 of one embodiment of the present invention in which a user access to restricted access Network Resource 118 is illustrated. Using Personal Computer 113 the user sends their network login identifier over networks 114 and 116 to Web Server 108 where upon receipt the login name is looked up in the user database that was created as part of provisioning the user's credentials and identities. If the user name is present, then Web Server 108 retrieves the user profile record, fetching from it the Security token (BD_ADDR of ID 111 Bluetooth controller) that is sent to Personal Computer over networks 116 and 114. Web server 108 then creates the eSID and PIR and transmits same over the cellular telephony networks 109 and 110 to the cellphone device identified by the Identifier Device address (phone number) information associated with the user name in the database—a phone number address that should lead to the user's Personal Identity Device, Cellphone 111. The communications method employed for this session are selected from a provisioned list of multiple options. The Cellphone 111 upon receipt of the eSID and PIR will validate the Owner Possession Probability Factor and as a result may add to the PIR after which it assembles the necessary identification information that includes, at minimum, the eSID, the internal identifier of the 111 Cellphone device, the Bluetooth address of the Cellphone's internal Bluetooth network controller and any proof of identities called for in the PIR which may include Personal Identification Number (PIN), Password or biometric (such as facial scan, finger print scan, voice sample, motion or use signature or other such biometric identifier). This data is then encrypted to create the eUID token that is then transmitted to the Personal Computer 113 over Bluetooth network 112 after which Personal Computer 113 will transfer the eUID over networks 114 and 116 via network infrastructure 115 to Web Server 108 for validation. Upon successful validation Web Server 108 signals network resource 118 via communications line 119 to authorize access by the user with unique session access token which is provided and then grants user access over networks 114 and 117 using the same session access token. While not shown, there are multiple aspects of use of the Personal Identifier Requirements PIR that are embraced by this invention that include, but are not limited to, the ability to omit Proof of Identity (PI) input during all or selected authentication sessions, to always include the content of OPPF, to require input of different PIs over different sessions and to require entry of multiple PIs during a single selected session and to tie entry of PI to a time period in such as way that PI input would be required for the first session in a time period but omitted for all other sessions during the same time frame and finally to require input of additional PI based on the value of Owner Possession Probability Factor.

Figure 1B:
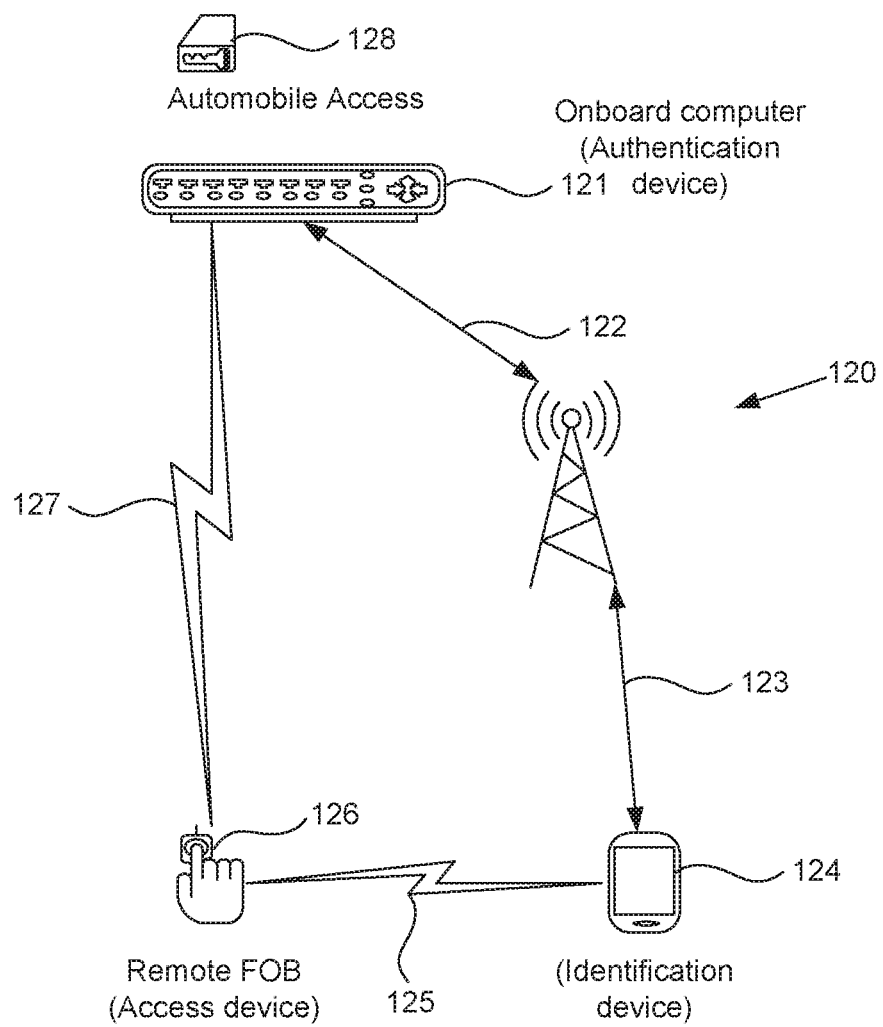
FIG. 1b illustrates an exemplary architecture of another embodiment of the triad network authentication process, authenticate user access to physical resources such as, for example, automobiles, boats, airplanes, commercial vehicles, building structures, homes and other physical properties for which controlled access is required or desired.

With reference to FIG. 1b, an exemplary architecture 120 of an embodiment of the present invention in which secure user access to a Vehicle 121, in this case an Automobile, is illustrated. Using Key FOB 126 the user signals their desire to unlock the automobile door by clicking a button on FOB 126 which sends their request signal over wireless network 127 to Onboard Computer 121 where, upon validation of the received signal the signaling device is looked up in the device user database that was created as part of provisioning the user's credentials, Cellphone 124 identities and FOB 126 signaling identities. The users profile record is retrieved and from it a Security token is obtained and transmitted to the FOB Access Device over network 127. Upon receipt of Security token FOB Access Device 126 establishes an instance of wireless network connection 125 over Bluetooth channel to Cellphone Personal Identity Device 124. Then Onboard Computer 121 creates an SID and ePIR and transmits same over an instance of the Cellphone telephone networks 122 and 123 to the device identified by the Personal Identity Device address (phone number) information associated with the user name in the database, a phone number address that should lead to the user's Personal Identity Device, Cellphone 124. The Cellphone 124 upon receipt of the eSID and ePIR will decrypt the ePIR to PIR and assemble the necessary identification information that includes, at minimum, the eSID, the internal identifier of the Cellphone 124 device and the address of the Cellphone's internal wireless network controller for network 125. The OPPF is consulted and if within a range as stipulated by provisioned data, an additional Proof of Identity (PI) is added to PIR. Using the PIR provided by Onboard Computer 121 and as may have been modified here, the specified PI's are collected from the user. The eSID, Cellphone 124 identifier, wireless controller identifier address and optional PI(s) are packaged together, encrypted into an eUID which is then transmitted to the FOB 126 over wireless network 125 after which FOB 126 will transfer the eUID over network 127 to Onboard Computer 121 for validation of all contents of the eUID. Upon successful validation Onboard Computer 121 signals the doors 128 to unlock and admit the user.

Figure 2:
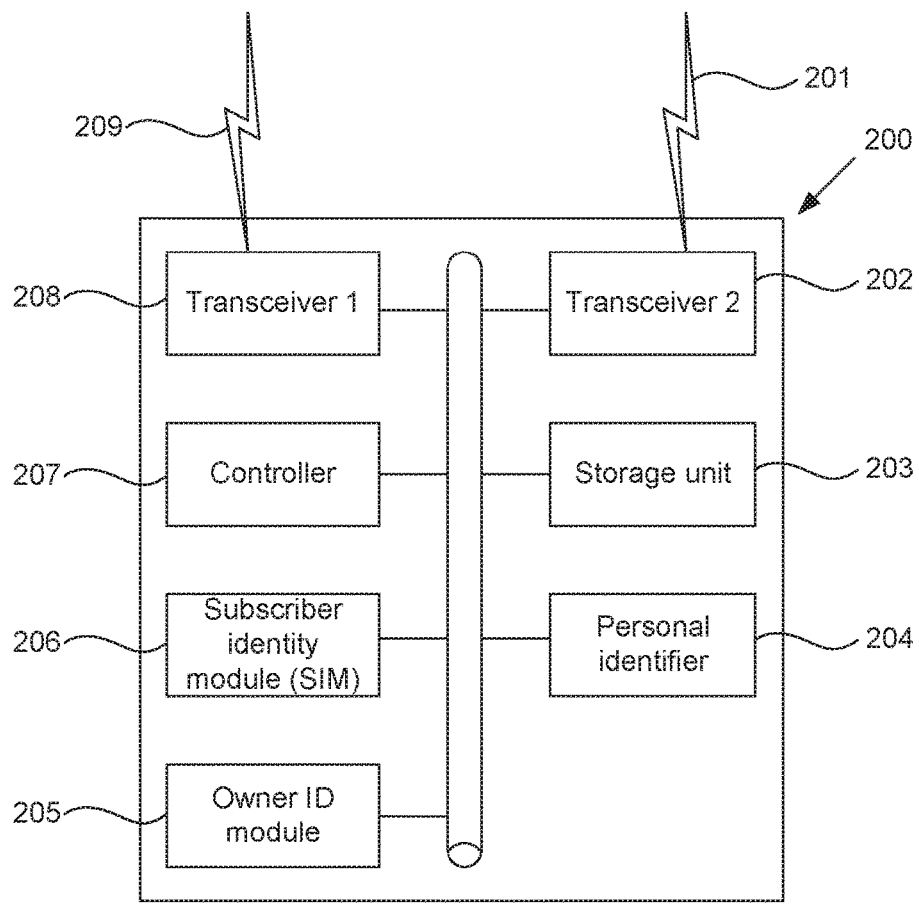
FIG. 2 is a block diagram of an exemplary embodiment of a wireless user security Personal Identification Device.
Figure 2A:
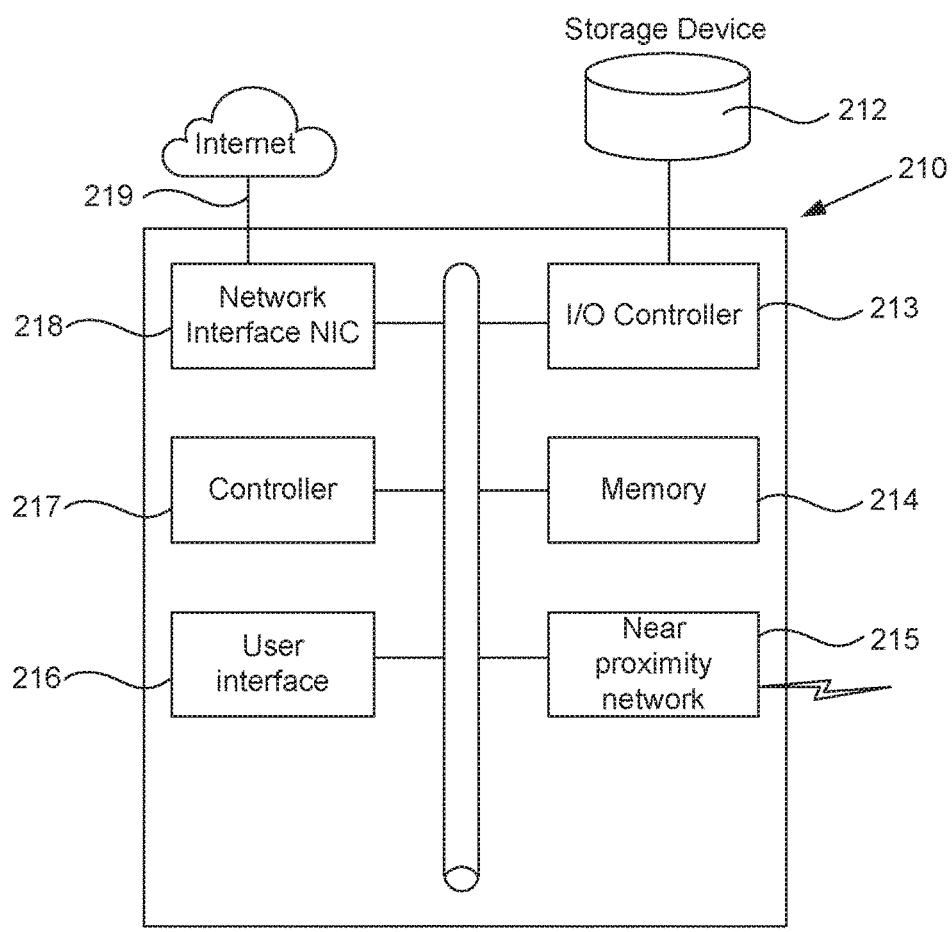
FIG. 2a is a block diagram of an exemplary embodiment of a minimally configured user access device.

With reference to FIG. 2a block diagram 200 of an exemplary Personal Identity Device 103 is illustrated. The Personal Identity Device 103 includes Transceivers 202 and 208 connected to networks 201 and 209 respectively, Controller 207, Storage 203, Subscriber Identity Module 206, Personal Identifier 204 and Owner ID Module (OIDM) 205. The Controller 207 can be hardware, software or any combination thereof. The Owner ID Module 205 can be hardware, software or any combination thereof. The Controller 207 is capable of receiving and sending digital information via network transceivers and is capable of retrieving digital information from peripheral devices such as subscriber identity modules and Personal Identity Devices such as user input devices, biometric capture devices and sensory devices, and is capable of storing and retrieving digital data in local storage devices. The Owner ID Module 205 is capable of detecting and learning personality traits of the Personal Identity Device owner employing any combination of multiple sensory devices such as, but not limited to, accelerometer, gyroscope, magnetometer, proximity sensor, light sensor, barometer, thermometer, pedometer, heart rate monitor, fingerprint sensors, camera, microphone, GPS receiver and ability to detect cell tower related information and to produce from these sensory inputs an operable signal that projects the probability the device is in the possession of its rightful owner and not being in the possession of or operated by someone other than the owner. The Controller 207 is also capable of receiving signal data from Owner ID Module 205 and processing data it has retrieved including the ability to perform computational algorithms that include the data retrieved and to apply complex digital encryption algorithms on the data retrieved and computed. Transceiver 1 208 is capable of communicating over the Cellular Networks 209 as a uniquely addressable device on a worldwide basis by employing identification and security operations utilizing inputs from Owner ID Module 205. Transceiver 2 202 is a near proximity networking controller, for example a Bluetooth controller, capable of communicating over wireless network 201 to other devices with like capability and within near proximity to the Identification Device 103. Transceiver 2 202 also uniquely addressable and includes support for Bonding and Security. The Controller 207 is capable of interpreting commands received from Transceiver 1 208 and acting on those commands to the extent that it can understand a command to retrieve and process various types of user inputs such as user entry of a Personal Identification Number or Password and ability to capture user biometric input such as face scan, fingerprint scan, voice scan or any other biometric as may become possible. The Controller 207 can also act on commands to capture and process inputs from accelerometers, thermometers and other like devices that may become available and to capture and process unique device addressing information from Subscriber Identity Module 206 and Transceiver 2 202. In addition, the Controller 207 is capable of acting on commands to assemble this collected information into packets of data combining those packets of data with other packets of data received over Network 209 and Transceiver 1 208 and to encrypt the collection utilizing public key information retrieved from Storage Unit 203 which was inserted in Storage Unit 203 as part of a provisioning process of Personal Identity Device 103. Controller 207 also has the ability to interpret commands resulting in connecting via Transceiver 2 202 to Access Device 105, either uniquely or by bonding, and to transfer over wireless Network 104 the encrypted data packets.

With reference to FIG. 2*a*, a block diagram 210 illustrating one embodiment of Access Device 105, for example similar to Personal Computer Access Device 113 is illustrated. On behalf of a user access by use of Access Device 105 through User Interface 216, the Controller 217 executes a program, such as for example a Web Browser program loaded from Storage Device 212 by use of I/O Controller 213 into Memory 214 after which Web Browser connects to the Internet via Network Interface NIC 218. Executing the loaded program and as directed by the user, Controller 217 then accesses the Authentication Device 101 at its logon Webpage presented by the Web Browser program transmitting to Authentication Device 101 user identification and receiving from Authentication Device 101 a Security token. Controller 217 establishes a pairing connection with Personal Identity Device 103 over the Near Proximity Controller and Network 215, for example by use of Bluetooth wireless network, utilizing the Security token value provided by Authentication Device 101 over Network 219 and Network Interface NIC 218 to authenticate and verify the Personal Identity Device to be the correct device. Controller 217 then requests Personal Identity Device 103 to transfer a eUID token after which Controller 217 transmits the eUID received to Authentication Device 101. Failure to receive eUID within a reasonable time frame results in aborting the authentication session, sending a about signal to the Authentication Device 101.

Figure 2B:
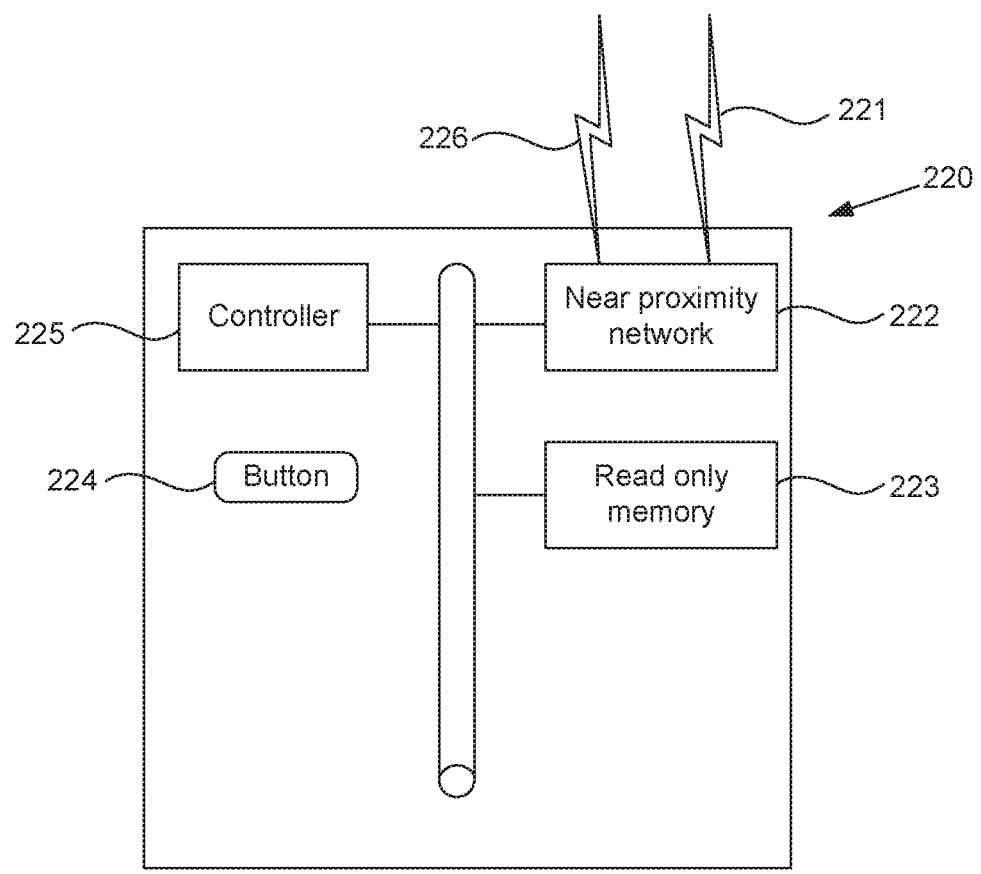
FIG. 2b is a block diagram of yet another exemplary embodiment of a minimally configured user access device.

With reference to FIG. 2*b*, a block diagram 220 illustrating an alternative embodiment of Access Device 105, for example similar to Remote Access FOB 126 is illustrated. The present invention recognizes that Access Device 105 need not be limited to the "Personal Computer" class of device and could in fact be implemented using much smaller and more targeted devices such as small security hardware devices like that of the Key FOB or Smartcard. At a minimum, such a device would incorporate the functionality as indicated in this diagram including a Read Only Memory 223 device into which necessary data could be stored, a Controller 225 device with ability to execute program instructions, a Near Proximity Network 222 wireless interface, such as for example Bluetooth, and a method by which a user can interact with the device, conceptualized in this diagram as Button 224. Part of the device provisioning process consists of recording certain data in Read Only Memory required for device operations including an Identity token that uniquely identifies this device. The Controller 225 can be hardware, software or any combination thereof. The Read Only Memory 223 can be any form of persistent storage. The Near Proximity Network transceiver 222 can be any form of near proximity wireless network so long as it supports communications with a minimum of two separate devices, 221 and 226 over secure addressable networks. The authentication session begins when a user indicates by, in this case, pressing Button 224. In response, Controller 225 establishes a communications session with Authentication Device 101 over wireless network 221 and transmits over that network connection the device Identity token retrieved from Read Only memory in response to which Authentication Device 101 returns a Security token. Controller 225 then establishes an instance of near proximity network 226 with Personal Identity Device 103 utilizing the Security token to validate and secure that network. At Authentication Device 101 this triggers, after validation, the authentication signaling process that leads to Controller 225 receiving from Personal Identity Device 103 over network 226 an eUID which it then transmits to Authentication Device 101 over network 221 for final validation of the authentication process.

Figure 2C:
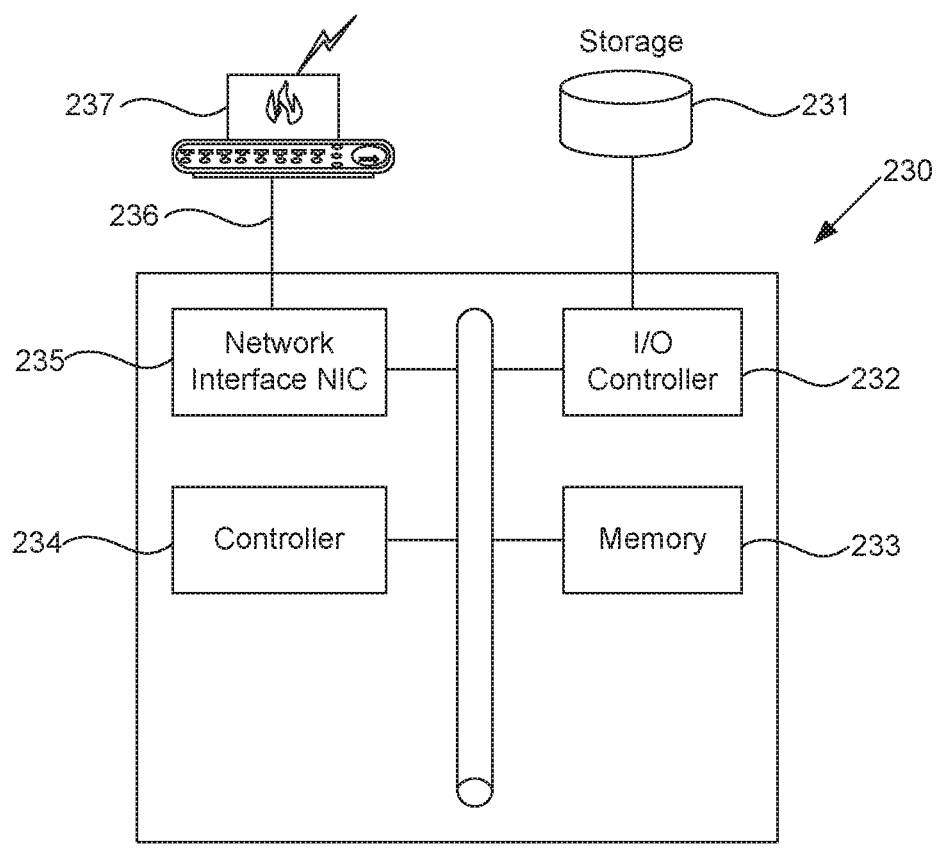
FIG. 2c is a block diagram of an exemplary embodiment of a minimally configured authentication device.

With reference to FIG. 2*c*, a block diagram 230 illustrating one exemplary embodiment of Authentication Device 101, for example similar to the core capabilities of a typical Web Server such as in 108 is illustrated. Controller 234 running a web server program application that was loaded from Storage 231 via I/O Controller 232 to Memory 233 provides users using a web browsing device such as Personal Computer 237, to access an unrestricted web page via which a user identifier, such as for example a user name, is provided to Controller 234. Upon receipt of a user identifier token via firewalled network adapter 237, network 236 and Network Interface NIC 235, Controller 234 obtains from a pre-provisioned user database on Storage 231 the user profile record associated with the user identity token provided and from that process performs a first level validation of the user identifier. A valid user identifier identifies a user record in the user database that contains several data items provisioned to the database during the user account provisioning process. These include the User Identifier used for identifying the database entry, access address, cellphone number, of the users Personal Identity Device 101, the Personal Identity Device 103 internal unique identifier, for example ICCID (Integrated Circuit Card Identifier) or IMSI (International Mobile Subscriber Identity) or MEI (unique unchangeable mobile device serial number), the Security token as near proximity wireless network controller address, for example a Bluetooth BD_ADDR, user identifier(s) such as Personal Identification Number (PIN), and/or Password and/or biometric key such as for example Facial Image, Finger Print image, Voice image, Retina Scan image or other possible biometric sources, public and private keys used for encrypting and decrypting identification data, and other data and information that may be required. After retrieving the user database profile record Controller 234 generates a unique Session Identifier (SID) that it then encrypts using the public encryption key to create an eSID. In addition, Controller 103 will create and encrypt a Personal Identification Requirements (ePIR) to specify what, if any, personal identifiers are required by this session. The ePIR can specify that no personal identifier is required or that one more is required and if more than one, then in what order. Further, ePIR settings can change from session to session. The ePIR and eSID are transmitted to Personal Identity Device 103 using its unique identifier, such as for example the Cellphone number of the user's Personal Identity Device 103. The present invention requires this communication be over one leg of a network triad but does not limit the form of the transmission or the network carriers and thus transmission may be via voice circuits using SOFTMODEM or by use of SMS or by use of EMAIL message or by use of a proxy network device wherein Personal Identity Device at 101 is directed to the proxy to obtain the eSID and ePIR. To improve security and reduce possibility of interception, the transmission scheme employed over this leg of the triad may change from session to session. At some measured point in time following this transmission Controller 234 will receive from user Access Device 105, such as PC, an eUID containing an eSID, Cellphone 124 identifier, near proximity wireless controller identifier address and optional Personal Identifier(s) (PI). After decrypting eUID the components within are then used to validate the requesting user's identity by comparing the various decrypted data with that expected from an authorized user, which was provisioned in the user database. Upon successful validation of user identity, the requested access is granted.

Figure 2D:
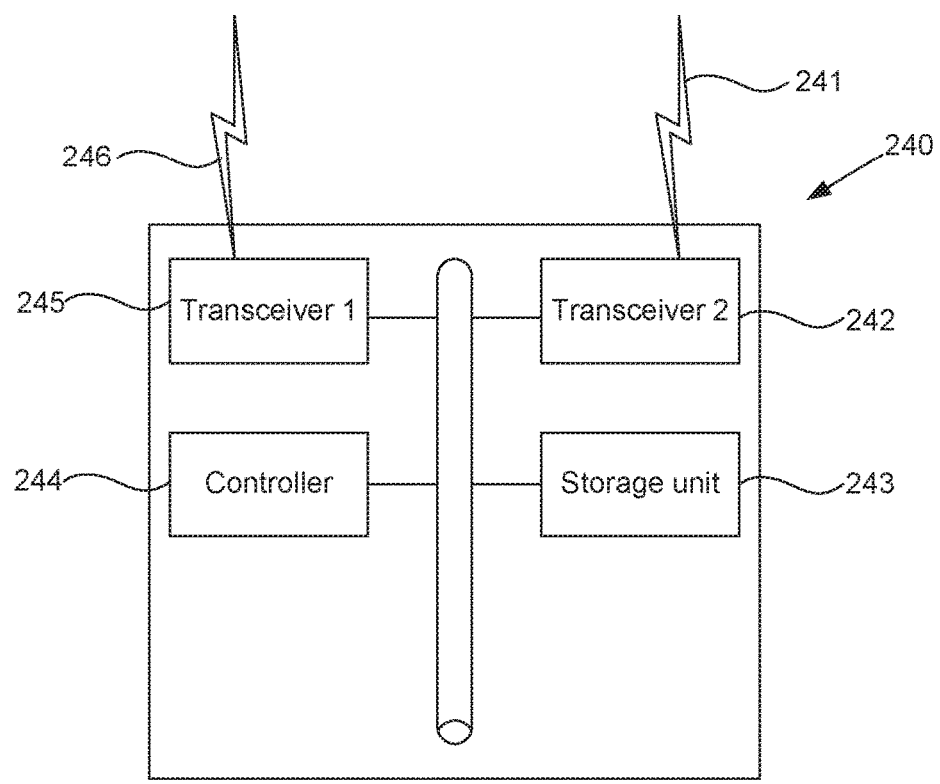
FIG. 2d is a block diagram of yet another exemplary embodiment of a minimally configured authentication device.

With reference to FIG. 2d, a block diagram 240 illustrating yet another embodiment of Authentication Device 101, for example similar to the core capabilities of a typical Onboard Computer of an automobile or facility Access Control computer such as in 121 is illustrated. Controller 244 running a control application from Storage Unit 243 provides a user using an Access Device 105, such as a Remote Key FOB 126 or security Personal Identity Device 1, to signal Controller 244 over wireless network 241 via Tranceiver-1 245, providing a unique User and Access Device Identity token, to perform a restricted function such as, for example to unlock a door to allow access. Upon receipt of the signal request Controller 244 will obtain from a pre-provisioned user database, also in Storage Unit 243, the user profile record and in so doing, confirm the User and Access Device identifier. Contained in this profile record are several data items provisioned to storage during the user account and Access Device 105 provisioning process. These include the User and Access Device Identifier used for identifying the storage database entry, access address, cellphone number, of the user's Personal Identity Device 103, the Personal Identity Device 103 internal unique identifier, for example ICCID, IMSI or IMEI, the near proximity wireless network controller address as Security token, for example a Bluetooth BD_ADDR, user identifier(s) such as Personal Identification Number (PIN), and/or Password and/or biometric key such as for example Facial Image, Finger Print image, Voice image, Retina Scan image or other possible biometric sources, public and private keys used for encrypting and decrypting identification data, Security and Identification Token that identifies the Personal Identity Device 103 and other data and information that may be required. After retrieving the user profile record, Controller 244 generates a unique Session Identifier (SID) that it then encrypts using the private encryption key to create an eSID. In addition, Controller 244 creates and encrypts a Personal Identification Requirements (ePIR) to specify what, if any, personal identifiers are required by this session. The ePIR, specifying requirement for 0 or more proofs of identity, and eSID are then transmitted over an instance of wireless cellular network 246 via Tranceiver-2 242 to cellphone Personal Identity Device 103 using its unique identification address, cellphone number, employing use of any of several different communications methods such as SOFTMODEM, SMS text message, EMAIL or by use of redirection to a proxy network device. The transmission method employed over this leg of the triad may change from session to session. Within a measured period of time following this transmission Controller 244 will receive from user Access Device 105 an eUID containing an eSID, Cellphone 124 identifier, near proximity wireless controller identifier address and optional Personal Identifier (PI). After decrypting eUID the components within are then used to validate the requesting user's identity by comparing the various decrypted data with that expected from an authorized user, which was provisioned in the user database. Upon confirming the user's identity, the requested access is granted or function performed.

Figure 3:
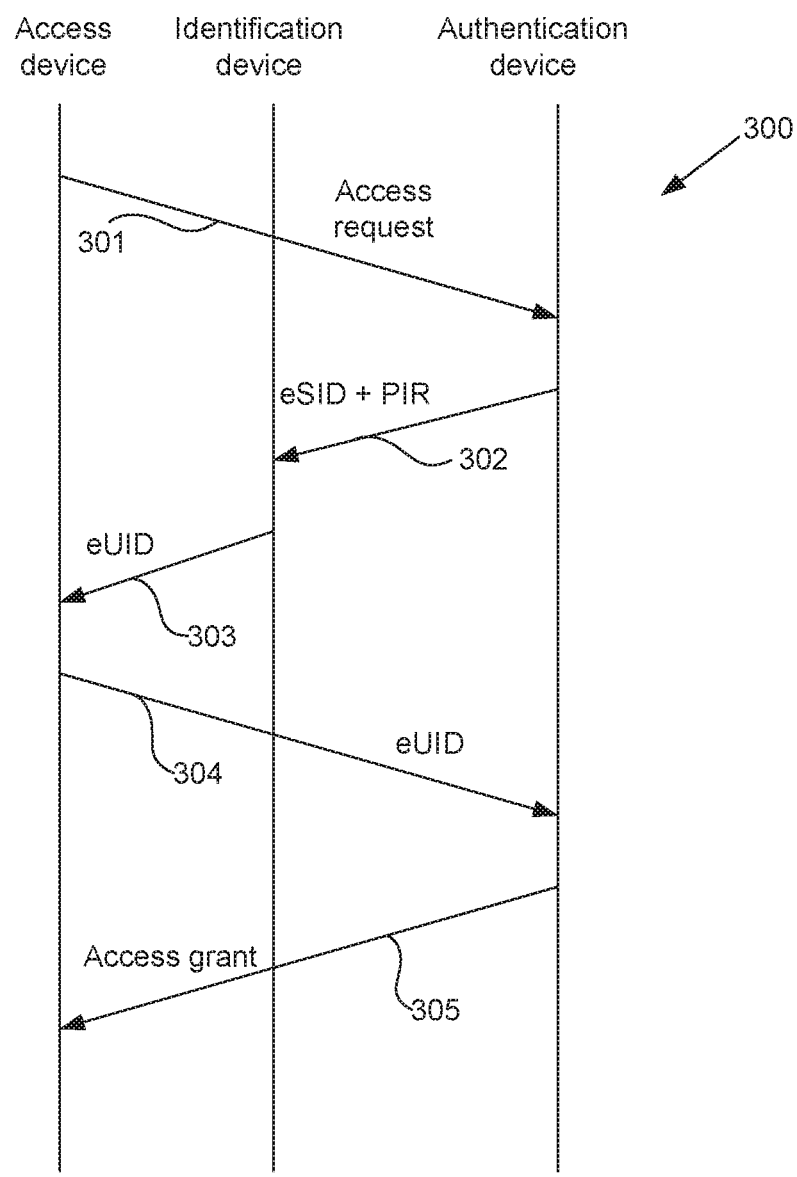
FIG. 3 illustrates an information exchange during the user authentication process.

With reference to FIG. 3, a diagram 300 illustrating one embodiment of an information exchange that occurs during a user authentication process is illustrated. The process of user authentication is carried as shown in 300 identifying a process that begins with a user requesting authentication for the purpose of accessing a resource by signaling an Access Request 301 to Authentication Device 101 passing information suitable for identifying the user within the User Database, such as for example a user name or Access Device 105 identifier. Upon Authentication Device 101 retrieving and validating stored user data based on the identity information provided with the Access Request, a unique one time encrypted Session Identifier, eSID, and encrypted Personal Identification Requirement, PIR, are created and transmitted 302 to Personal Identity Device 103. Personal Identity Device 103 upon receipt and confirmation of the eSID and PIR collects additional data including device identifiers, such as for example BD_ADDR+ICCID or IMSI or IMEI, and depending on directions of the PIR, user proof of identity information such as Personal Identification Number or Password or Biometric or combination thereof, encrypting that data along with eSID to create the eUID that is then transmitted 303 to Access Device 105 where upon receipt the eUID is transmitted by Access Device 105 to Authentication Device 101. Authentication Device 101 receives and decrypts 304 the eUID and employing appropriate validation measures, validates the decrypted contents and if no errors are discovered issues an Access Grant 305. Note that the actual application of the Access Grant will vary from one application of this invention to another. For example, in a more typical networking situation the access grant may be used to signal authorization for the user to access a network resource. In another application, it may be used to unlock doors to allow access to a physical property or thing. In yet another application it may be employed to grant user portal passage such as boarding train, plane or bus or passage through security zones at events, airports, train or bus stations and any other gathering place having heightened security.

Figure 4:
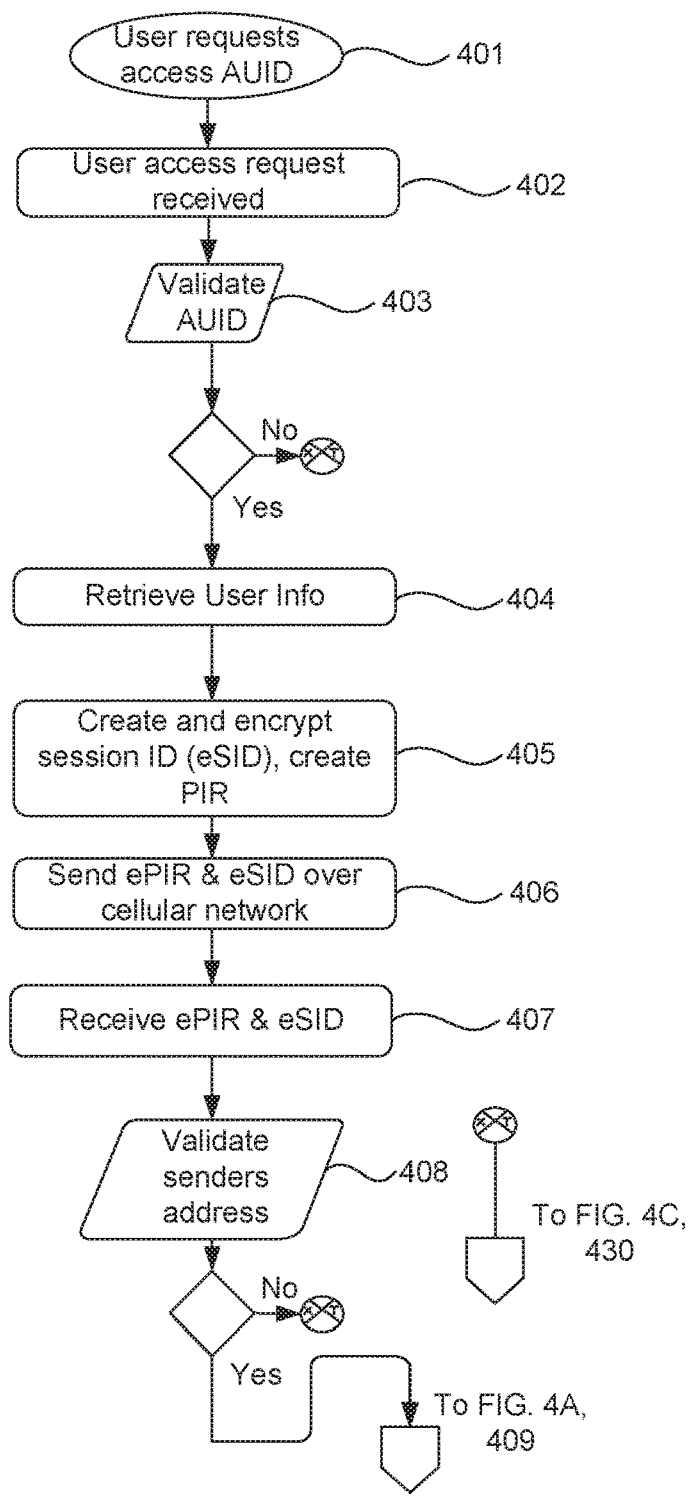
FIGS. 4-4c is a continuous flow chart showing an exemplary embodiment of the user authentication process.
Figure 4A:
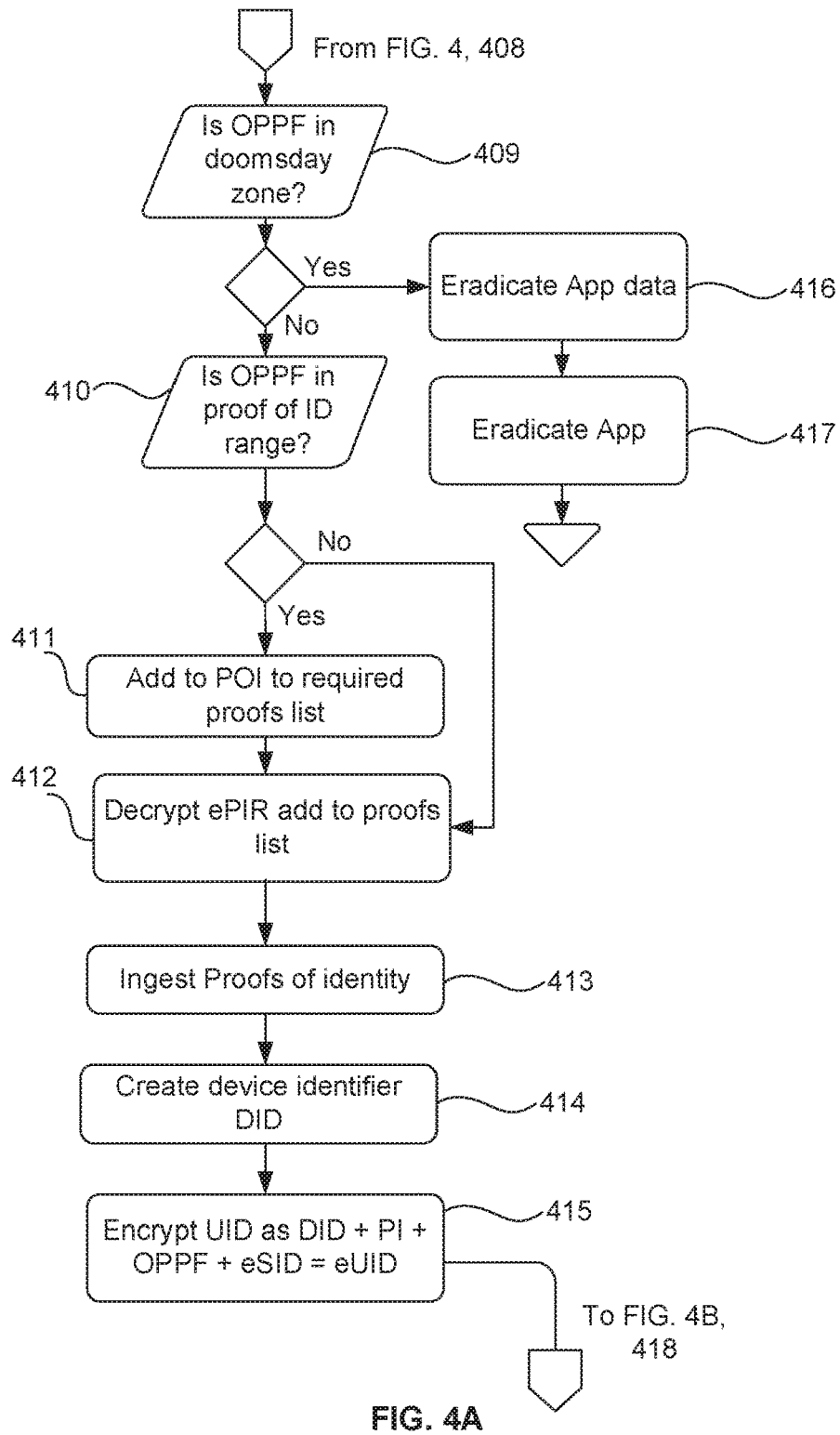
Figure 4B:
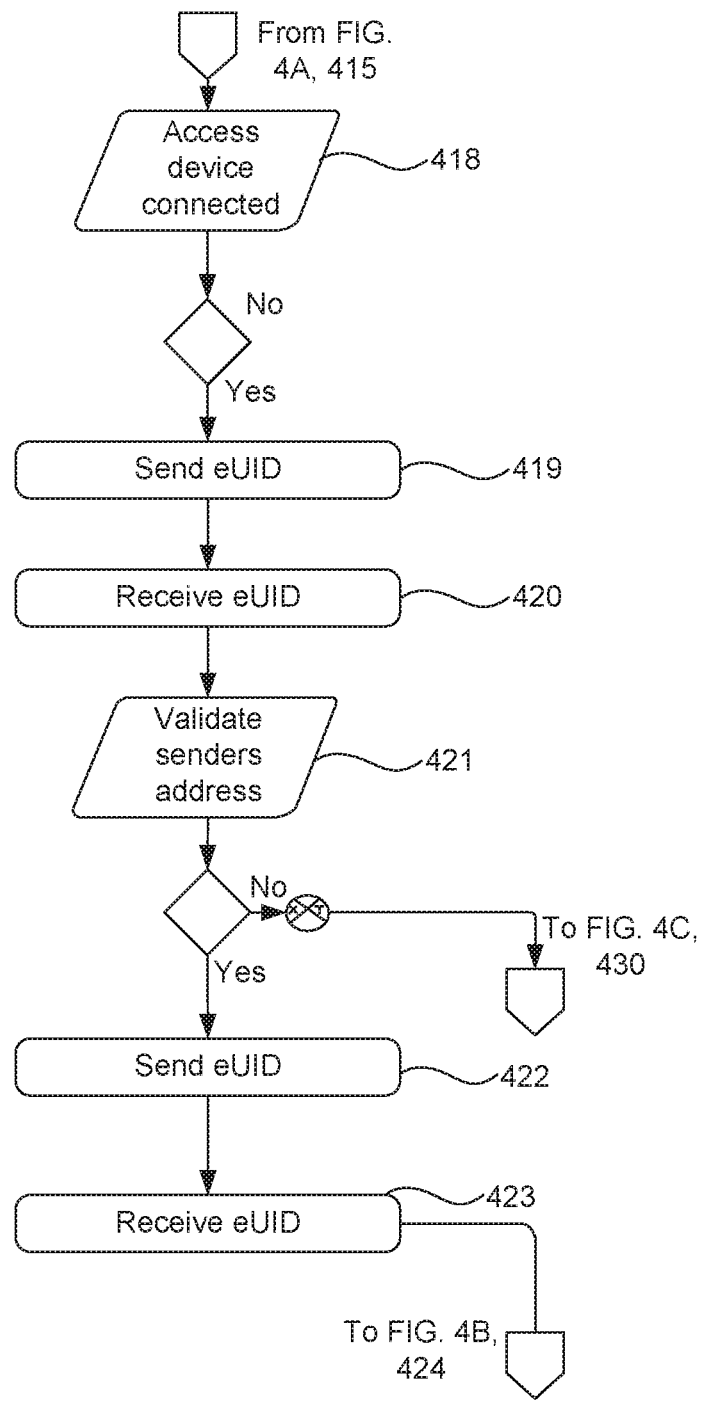
Figure 4C:
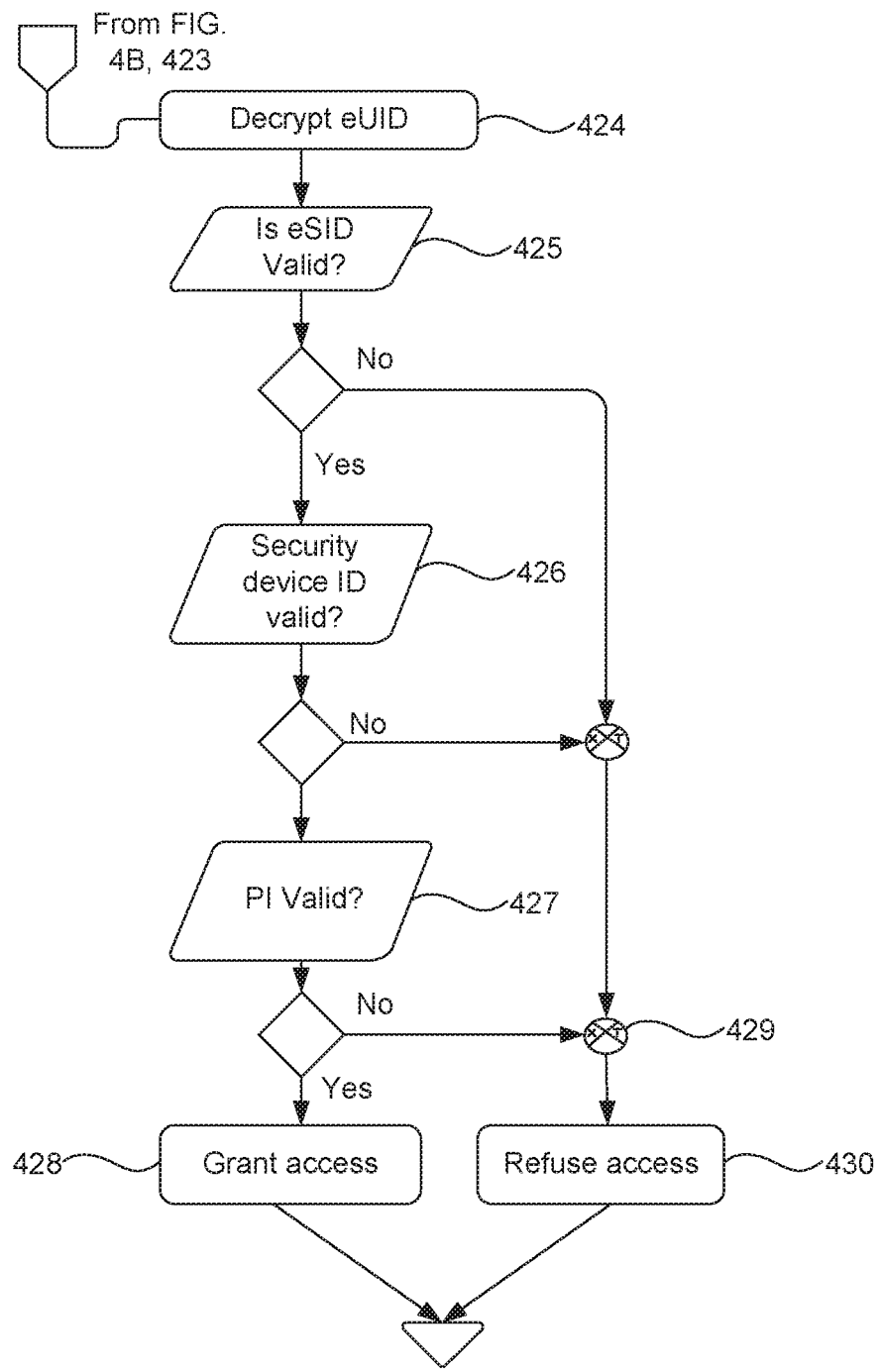

With reference to FIG. 4, a flow chart depicting a flow diagram of one embodiment of the present invention showing the complete process flow from a user requesting access to a restricted resource or function through the authentication process leading up to either granting or denying the access is illustrated. Beginning the authentication process occurs at 401 with a user signaling a request that can be in any of several different forms depending on the application resulting in A Unique Identifier. At 402, the user identity information, AUID, is received and validated 403 and if invalid then the access request is rejected. Validation is by any means suitable to the implementation including by reference to a stored user database. If the user identity is found to be valid then it is used to retrieve the user profile record, a record of data components required by the authentication process that is stored securely on or available to the Authentication Device 101 in any appropriate way to the application including by use of a database. From the user profile record, information is retrieved indicating the type of Personal Proof of Identification method to be used, if any, and from this creating the Personal Identity Requirements, PIR. After retrieving user information 404, a unique Session Identifier (SID) is created 405 using methods appropriate for the implementation and then encrypted to create an eSID after which the ePIR and eSID are sent 406 over one leg of the triad authentication network such as by use of cellular network using methods such as by SOFTMODEM, SMS, EMAIL or proxy delivery device. At 407, the ePIR and eSID are received by Personal Identity Device 103 and the senders address checked to verify they are from the expected sender. If not, then the process is aborted at that point and allowed to time out signaling rejection of the access request. At 409, the Owner Possession Probability Factor value is tested to determine if it has fallen into the doomsday range wherein the indication is that Personal Identity Device is now in the possession of someone other than its owner and if so then the authentication session is abandoned and defensive measures invoked, measures that could extend to and include eradication of the authentication application and all of its related data as indicated at 416 and 417. Should this not be the case then the value is tested at 410 to determine if it is in the range that requires proof of identity and if so then that proof requirement is added to the internal Proof Of Identity list at 411. At 412 the ePIR is decrypted and its contents added to the internal Proof Of Identity requirements list after which that list is employed to force ingestion of all proofs required 413, a process by which the person having possession of Personal identity Device 103 is required to provide proofs they are the owner of the device. These proofs along with unique identifiers of Personal Identity Device 103, such as for example ICCID (Integrated Circuit Card Identifier) or (International Mobile Subscriber Identity) or IMEI (unique unchangeable mobile device serial number), and the near proximity network controller address, such as for example BD_ADDR that combined represent the Device Identifier 414, and the eSID are collected together and encrypted to create the eUID at 415. At 418 it is determined if a secure near proximity network has been established and if not the process is aborted allowing the original access request to time out. Otherwise, at 419 the eUID is sent over the near proximity network to the users Access Device. At 420 the eUID is received by Access Device 105 and the transmission verified at 421 after which eUID is then sent 422 over the original network to Authentication Device 101. At 423 the eUID is received followed by the task of validating the user's identity. The first step in that validation at 424 is to decrypt the eUID. The eSID is decrypted and validated by comparing it at 425 to the original sent to Personal Identity Device 103 and failing that the user access request is rejected. Next, at 426, the Personal Identity Device 103 identifiers are validated and if that validation should fail then the access request is rejected. At 427 the contents of PI, if any, are validated and if failing, the user access request is rejected. If all identification data is confirmed, then at 428, the user access request is acknowledged and the user granted access to the resource. The off page connector at 429 is provided to provide for connection to the Refuse Access alternative at 430.

Within the context of the present invention herein described, the system may be implemented, for example, by operating portion(s) of the communication networks, such as a wireless Personal Identity Device, and Authentication Device and Access Device, to execute a sequence of machine-readable instructions by use of a computational central processing unit. The instructions can reside in various types of signal-bearing or data storage primary, secondary, or tertiary media. The media may comprise, for example, RAM, DRAM, Flash, ROM, PROM, EPROM (not shown) accessible by, or residing within, the components of the communication networks. No matter the media method employed, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media. The following descriptions of use scenarios illustrate application of this invention in a typical current age setting.

The following descriptions use scenarios to illustrate application of this invention in typical current agent setting.

John uses online banking to maintain his bank accounts that are secured by use of this invention. When logging into his accounts he clicks on the Logon button on the banks home page and after a short pause, he is granted access to his accounts with no requirement for additional credentials.

In a variant of the above, John drives up to the Banks ATM machine, inserts his debit card and after a brief pause, is allowed access to his ATM bank accounts with no additional credentialing required.

In both instances, John's credentials were authenticated by use of an implementation of this invention, During the brief pause in each case following John clicking the Logon button or inserting his debit card into the ATM machine, a message including John's unique personal identifier was sent to the banks webserver from his personal computer or the ATM. At the webserver, it is used to locate and retrieve John's profile from the user database. John's Security token is then retrieved from the profile and sent back to the requesting device where it, the Security token, is used by the personal computer or ATM to create and validate a near proximity network instance between the accessing machine and John's cellphone. The webserver then uses information from the profile to create and encrypt a Session Identifier (eSID) and to generate an encrypted Personal Identity Requirement token (ePIR) that are then transmitted to John's cell phone over the cellular network using a randomized selection of communication methods. John's cellphone, having already established a near proximity connection with either the personal computer or ATM machine inspects owner probability of possession factor indicating the cellphone is in the possession of its owner and an ePIR requiring no proofs of identity, assigns the owner probability of possession factor as the personal identifier value. The cellphone then creates an encrypted User ID token (eUID) by combining the eSID, cellphone identity information and proof(s) of identity. The &ND is then transmitted over the near proximity network to the personal computer or ATM and then on from there to the web server. At the web server the contents of the eUID, after decryption, are validated using data within John's profile record and should those validations succeed John is granted access to his accounts.

Those skilled in the art will appreciate that use of a cellphone as a Personal Identity Device 103 is for explanation purpose only and that other alternative devices with similar capabilities could be employed. They will also appreciate that use of a Personal Computer as Access Device 105 is for explanation purpose only and that other alternative devices could be substituted to perform the tasks outlined herein. They will also appreciate that use of a webserver as Authentication Device 101 is for explanation purpose only and that other alternative devices with similar capabilities as required and defined herein could be substituted. They will appreciate that the messages methods and schemes employed herein are for explanation only and that there are many other schemes that could be used to implement the methodology of this present invention. Finally, the networks mentioned herein for explanation purpose can be substituted with different networking methodologies and technologies without mitigating the present invention.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A method for verification of right to access restricted resources or spaces by a person using a system comprising three networks connecting three devices, each of the three devices having two network interfaces that are connected to two of the three networks with no two devices connected to the same pair of networks, the method comprising:
   a first device of the three devices initiating a right to access verification session by transmitting a session identifier token over a first network of the three networks to a second device of the three devices which is an identification relay device, the second device is assigned to the person for which verification is being performed;
   the second device, at a time of receiving the session identifier token over the first network, producing an identification token indicative of the identity of the person in possession of the second device, the second device transmitting the session identifier token and the identification token to a third device over a second network of the three networks;
   the third device receiving the session identifier token and the identification token from the second device over the second network;
   the third device relaying the session identifier token and identification token to the first device over a third network of the three networks;
   the first device receiving and verifying the session identifier token, establishing an integrity of the session;
   upon satisfaction of session integrity, the first device verifies the identification token; and
   the first device issuing a proclamation as to affirmation of the identity of the person seeking access to the restricted resource or space.

2. The method of claim 1, wherein the step of producing the identification token indicative of the identity of the person in possession of the second device includes:
   capturing sensory data and inputs in real time from a plurality of sensors and input devices, the sensors and input devices being interfaced to the second device;
   comparing the sensory data to a stored profile of an owner of the second device to produce a probability that the second device is in possession of the owner of the second device; and
   if the probability that the second device is in possession of the owner of the second device is greater than a predetermined threshold, generating the identification token based upon a probability of the likelihood that the second device is in the possession of the second device.

3. The method of claim 2, wherein if the probability that the second device is in possession of the owner of the second device is greater than a predetermined threshold, collecting a proof of identity from the user before the step of generating the identification token.

4. The method of claim 3, wherein the proof of identity includes a personal identification number.

5. The method of claim 3, wherein the proof of identity includes a password.

6. The method of claim 3, wherein the proof of identity includes receiving a fingerprint image from a capture device.

7. The method of claim 3, wherein the proof of identity includes receiving a palm print from a capture device.

8. The method of claim 3, wherein the proof of identity includes receiving a facial image from a capture device.

9. The method of claim 3, wherein the proof of identity includes receiving a retinal image from a retinal scanner.

10. The method of claim 3, wherein the proof of identity includes receiving an audio snippet from a microphone.

11. The method of claim 2, further comprising learning the stored profile of the owner of the second device by monitoring personality traits of the owner of the second device over a period of time by monitoring one or more sensory devices as the second device is used by the owner of the second device.

12. The method of claim 2, wherein the one or more sensory devices is selected from the list of an accelerometer, a gyroscope, a magnetometer, a proximity sensor, a light sensor, a barometer, a thermometer, a pedometer, a heart rate monitor, a fingerprint sensor, a camera, a microphone, a GPS receiver, and a radio transceiver that is configured to detect cell tower related information.

13. The method of claim 1, wherein the second device is a cellphone.

14. The method of claim 1, wherein the first device is an automated teller machine (ATM).

15. The method of claim 1, wherein the third network is a cellular network.

16. A system of identification comprising:
   a device having two network connections, the device configured to receive a session identifier token from a first network connection of the two network connections, on the instance of receipt of the session identifier token, the device produces a real number identification token indicative of a probability that a person in possession of the device is a person to which the device is assigned; and
   the device configured to transmit the session token and the real number identification token over a second network connection of the two network connections,
   wherein the first network connection is interfaced to a different network than the second network connection.

17. The system of claim 16, wherein the device produces the real number identification token indicative of the probability that the person in possession of the device is the person of which the device is assigned by:

capturing sensory data and inputs in real time from a plurality of sensors and input devices, the sensors and input devices being interfaced to the device;

comparing the sensory data to a stored profile of the person to which the device is assigned to produce the probability that the person in possession of the device is the person to which the device is assigned.

18. The system of claim 17, further comprising learning the stored profile of the owner of the second device by monitoring personality traits of the owner of the device over a period of time by monitoring one or more sensory devices as the second device is used by the owner of the second device.

19. The system of claim 18, wherein the one or more sensory devices is selected from the list of an accelerometer, a gyroscope, a magnetometer, a proximity sensor, a light sensor, a barometer, a thermometer, a pedometer, a heart rate monitor, a fingerprint sensor, a camera, a microphone, a GPS receiver, and a radio transceiver that is configured to detect cell tower related information.

20. The system of claim 16, wherein the device is a cellphone.

21. The system of claim 20, wherein the second network is a cellular network.

\* \* \* \* \*